United States Patent
Chen et al.

(10) Patent No.: US 12,265,607 B2
(45) Date of Patent: Apr. 1, 2025

(54) METHOD, DEVICE, AND COMPUTER PROGRAM PRODUCT FOR EXECUTING COMPUTER PROGRAMS

(71) Applicant: Dell Products L.P., Round Rock, TX (US)

(72) Inventors: Tianxiang Chen, Shanghai (CN); Jinpeng Liu, Shanghai (CN); Anzhou Hou, Shanghai (CN); Zhen Jia, Shanghai (CN)

(73) Assignee: Dell Products L.P., Round Rock, TX (US)

(*) Notice: Subject to any disclaimer, the term of this patent is extended or adjusted under 35 U.S.C. 154(b) by 334 days.

(21) Appl. No.: 17/966,313

(22) Filed: Oct. 14, 2022

(65) Prior Publication Data
US 2024/0095339 A1    Mar. 21, 2024

(30) Foreign Application Priority Data
Sep. 15, 2022  (CN) .......................... 202211124985.X

(51) Int. Cl.
  *G06F 21/53*  (2013.01)
  *G06F 21/60*  (2013.01)
  *G06N 3/08*  (2023.01)

(52) U.S. Cl.
  CPC ............ *G06F 21/53* (2013.01); *G06F 21/602* (2013.01); *G06N 3/08* (2013.01); *G06F 2221/2105* (2013.01)

(58) Field of Classification Search
  CPC ................... G06F 21/53; G06F 21/602; G06F 2221/2105; G06N 3/08
  See application file for complete search history.

(56) References Cited

U.S. PATENT DOCUMENTS 12,072,954 B1 * 8/2024 Li ........................ G06F 18/2148
12,095,796 B1 * 9/2024 Godefroid ............... G06F 9/542
(Continued)

OTHER PUBLICATIONS

D. Stutz, "Implementing Tensorflow Operations in C++—Including Gradients," https://davidstutz.de/implementing-tensorflow-operations-in-c-including-gradients/, Feb. 4, 2017, 14 pages.
Github, Inc. "Create an op," https://github.com/tensorflow/docs/blob/master/site/en/guide/create_op.md, Jul. 16, 2020, 30 pages.
(Continued)

*Primary Examiner* — Stephen T Gundry
(74) *Attorney, Agent, or Firm* — Ryan, Mason & Lewis, LLP

(57) ABSTRACT

Embodiments of the present disclosure relate to a method, a device, and a computer program product for executing computer programs. The method includes implementing multiple executions of a deep neural network that includes a hooking portion outside a trusted execution environment (TEE), wherein an operator in the hooking portion, when executed outside the TEE, invokes a corresponding execution operator in the TEE. During the period, the method includes determining, on the basis of the invocation of the corresponding execution operator in the TEE by the operator in the hooking portion, a computation graph corresponding to the hooking portion. The method further includes executing, on the basis of the computation graph, the execution operator corresponding to the hooking portion in the TEE during the execution of the deep neural network after the multiple executions.

20 Claims, 6 Drawing Sheets

(56) References Cited

U.S. PATENT DOCUMENTS

| | | | | |
|---|---|---|---|---|
| 12,126,643 | B1* | 10/2024 | Skarphedinsson | G06F 16/9024 |
| 2019/0392305 | A1* | 12/2019 | Gu | G06F 21/53 |
| 2020/0082270 | A1* | 3/2020 | Gu | G06N 3/045 |
| 2021/0097186 | A1* | 4/2021 | Mandal | G06F 21/552 |
| 2021/0192314 | A1* | 6/2021 | Aarts | G06N 3/044 |
| 2021/0232933 | A1* | 7/2021 | Gu | G06N 3/08 |
| 2023/0394307 | A1* | 12/2023 | Zhu | G06N 3/08 |
| 2024/0096074 | A1* | 3/2024 | Okorn | G06N 3/0455 |
| 2024/0104345 | A1* | 3/2024 | Peng | G06N 3/063 |
| 2024/0104698 | A1* | 3/2024 | Nie | G06N 3/044 |
| 2024/0126811 | A1* | 4/2024 | Law | G06F 16/9024 |
| 2024/0154802 | A1* | 5/2024 | He | G06N 5/04 |
| 2024/0272943 | A1* | 8/2024 | Tadkase | G06F 11/0757 |
| 2024/0281524 | A1* | 8/2024 | Edwards | G06F 21/552 |
| 2024/0291863 | A1* | 8/2024 | Cohen | H04L 63/1483 |
| 2024/0320512 | A1* | 9/2024 | Zhai | G06N 3/045 |

OTHER PUBLICATIONS

Microsoft, "Microsoft Seal," https://www.microsoft.com/en-us/research/project/microsoft-seal/, 2021, 4 pages.
Fate, "An Industrial Grade Federated Learning Framework," https://fate.fedai.org/, 2021, 5 pages.
Github, Inc. "Deep Learning with Intel SGX," https://github.com/landoxy/intel-sgx-deep-learning, Jan. 21, 2019, 4 pages.
Intel Corporation, "Intel® SGX SDK Developer Reference for Windows," Mar. 10, 2020, 461 pages.
Wikipedia, "Software Guard Extensions," https://en.wikipedia.org/w/index.php?title=Software_Guard_Extensions&oldid=1028673056, Jun. 15, 2021, 5 pages.
Wikipedia, "Trusted Execution Environment," https://en.wikipedia.org/w/index.php?title=Trusted_execution_environment&oldid=1027841774, Jun. 10, 2021, 7 pages.
U.S. Appl. No. 17/352,653 filed in the name of Jinpeng Liu et al., filed Jun. 21, 2021, and entitled "Training Data Protection in Artificial Intelligence Model Execution Environment."

* cited by examiner

METHOD, DEVICE, AND COMPUTER PROGRAM PRODUCT FOR EXECUTING COMPUTER PROGRAMS

RELATED APPLICATION

The present application claims priority to Chinese Patent Application No. 202211124985.X, filed Sep. 15, 2022, and entitled "Method, Device, and Computer Program Product for Executing Computer Programs," which is incorporated by reference herein in its entirety.

FIELD

Embodiments of the present disclosure relate to computer technologies, and more specifically, to a method, a device, and a computer program product for executing computer programs.

BACKGROUND

A trusted execution environment (TEE) is a secure area constructed by a hardware/software method on a computing platform, which can be used for protecting code and data loaded in it. A TEE provides an isolated computing area, and a trusted hardware platform can provide various services to protect program code and data in the TEE from being accessed and altered by programs (such as an operating system, a management program, or other applications) outside the TEE.

A certified (authenticated) program or program portion can be loaded into the TEE to ensure that the loaded content is secure and not tampered with. In addition, a data provider can also provide confidential and encrypted sensitive data to a certified TEE. These encrypted sensitive data are then decrypted for use in the TEE. In this way, other parties outside the TEE cannot know the content of the sensitive data.

SUMMARY

Embodiments of the present disclosure provide a method, a device, and a computer program product for executing computer programs.

In a first aspect of the present disclosure, a method for executing computer programs is provided, including: implementing multiple executions of a deep neural network, the deep neural network comprising a hooking portion outside a trusted execution environment (TEE), wherein an operator in the hooking portion, when executed outside the TEE, invokes a corresponding execution operator in the TEE; determining, on the basis of the invocation of the corresponding execution operator in the TEE by the operator in the hooking portion, a computation graph corresponding to the hooking portion during the multiple executions of the deep neural network; and executing, on the basis of the computation graph, the execution operator corresponding to the hooking portion in the TEE during the execution of the deep neural network after the multiple executions.

In a second aspect of the present disclosure, an electronic device is provided, which includes a processor and a memory coupled to the processor. The memory has instructions stored therein. The instructions, when executed by the processor, cause the device to execute actions that include: implementing multiple executions of a deep neural network, the deep neural network comprising a hooking portion outside a TEE, wherein an operator in the hooking portion, when executed outside the TEE, invokes a corresponding execution operator in the TEE; determining, on the basis of the invocation of the corresponding execution operator in the TEE by the operator in the hooking portion, a computation graph corresponding to the hooking portion during the multiple executions of the deep neural network; and executing, on the basis of the computation graph, the execution operator corresponding to the hooking portion in the TEE during the execution of the deep neural network after the multiple executions.

In a third aspect of the present disclosure, a computer program product is provided. The computer program product is tangibly stored on a non-transitory computer-readable medium and includes machine-executable instructions. The machine-executable instructions, when executed by a machine, cause the machine to execute the method according to the first aspect of the present disclosure.

It should be noted that this Summary part is provided to introduce a selection of concepts in a simplified manner, and these concepts will be further described in the Detailed Description below. The Summary is neither intended to identify key features or major features of the content of the present disclosure, nor intended to limit the scope of the content of the present disclosure.

BRIEF DESCRIPTION OF THE DRAWINGS

By further detailed description of example embodiments of the present disclosure, provided herein with reference to the accompanying drawings, the above and other objectives, features, and advantages of the present disclosure will become more apparent, in which.

Throughout all the drawings, the same or similar reference numerals represent the same or similar elements.

DETAILED DESCRIPTION

Figure 1:
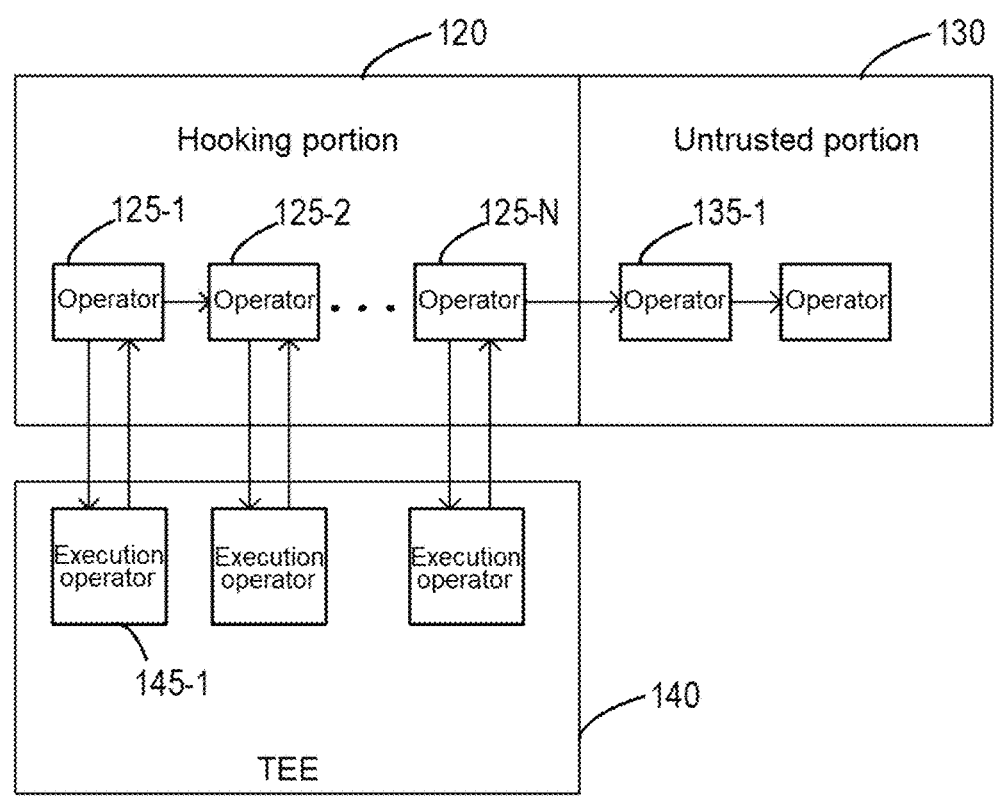
FIG. 1 shows a schematic diagram of a deployment of an example deep neural network executed using a TEE.

Illustrative embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

A trusted execution environment (TEE) is a secure area constructed by a hardware/software method on a computing platform, which can be used for protecting code and data loaded in it. In some implementations, such secure area is also referred to as an enclave. For ease of description, the terms "TEE" and "enclave" are used interchangeably herein. A TEE provides an isolated computing area, and a trusted hardware platform can provide various services to protect code and data in the TEE from being accessed and altered by programs (such as an operating system, a management program, or other applications) outside the TEE.

For example, a sub-model of a deep neural network can be loaded in the TEE. However, using the TEE to execute programs involves complex interactions and scheduling, has significant adverse impact on the performance of complex programs, especially deep neural networks, and is prone to errors. Therefore, there is a need for a solution that uses a TEE to efficiently and appropriately execute complex programs. It should be noted that unless expressly stated otherwise, a neural network (or neural network model) or its assemblies mentioned herein refer to computer implementations (for example, computer-executable program code, such as a function for implementing an operator) that can be executed by a computer and correspond to the neural network or its portions, not a conceptual model.

To at least partially solve the above and other potential problems, embodiments of the present disclosure provide a solution for executing computer programs. In this solution, a TEE is used to deploy a deep neural network. An overall framework of the deep neural network is loaded outside the TEE, and one portion of deep neural network is implemented as a hooking portion. When an operator in the hooking portion is executed, the operator invokes a corresponding execution operator in the TEE to execute an actual function. Based on this, embodiments of the present disclosure execute a deep neural network in different ways at two stages of executing the neural network. During several executions of the neural network at a warm-up stage, a computation graph of a network portion corresponding to the hooking portion is learned into the TEE on the basis of the invocation of the execution operator by the operator of the hooking portion. In a subsequent optimization execution stage, according to the learned computation graph, the execution operators corresponding to the hooking portion are executed and interact with one another completely in the TEE to execute corresponding actual computation paths without returning intermediate results out of the TEE. Execution of the neural network in this way can reduce the unnecessary communication cost across a TEE boundary, thereby improving the execution efficiency.

Based on this, in some embodiments of the present disclosure, each execution of the neural network corresponds to a round of training iteration, and the hooking portion includes one or more foremost layers of the neural network. Since the warm-up stage, the gradient of each component calculated in the backward propagation of each round of iteration will be saved. At the optimization execution stage, a statistical value (for example, an average value) of the saved multiple rounds of gradients can be used for updating weights in the backward propagation. Furthermore, the gradient calculated in the current iteration is then used for replacing the saved oldest round of gradient. Therefore, when a series of operators in the TEE have completed the forward propagation of the current iteration and output results to a next layer outside the TEE, a next round of iteration can be concurrently started while this round of iteration still proceeds. Execution of the training iteration of the deep neural network in such concurrent manner can shorten the average execution time of one iteration on the premise that the forward propagation can proceed normally, thereby further improving the execution efficiency.

When the solution of the present disclosure is used to execute a deep neural network, the security of all aspects of the neural network can be protected using the TEE, and the adverse impact of the performance bottleneck of the TEE on the overall execution performance of the neural network can be reduced, so that the neural network can be securely, appropriately, and efficiently executed.

FIG. 1 shows a schematic diagram of a deployment of example deep neural network 100 executed using a TEE. An overall framework of deep neural network 100 is loaded outside TEE 140. One or more foremost layers including an input layer are implemented as hooking portion 120, and the remaining portion is implemented as untrusted portion 130.

An operator in untrusted portion 130 includes an actual implementation of its functions (for example, calculating an output from the operator in forward propagation of a training iteration of deep neural network 100 and calculating a gradient in backward propagation of the training iteration), so that this portion is completely executed in an untrusted environment outside TEE 140 when deep neural network 100 is executed.

In contrast, each operator in hooking portion 120 does not include an actual implementation of its functions. Rather, the operator in hooking portion 120 has a corresponding (or "hooking") execution operator in TEE 140. These execution operators include actual implementations of corresponding functions. During the execution of deep neural network 100, when an operator in hooking portion 120 is executed, the operator invokes (for example, via an authorized interface) its hooking execution operator in TEE 140 to perform actual functions. Thus, the corresponding execution operator is shadowed by the operator, so that these actual functions appear to be executed by a shadowing operator from the perspective of a party invoking the operator. Therefore, such operator in hooking portion 120 is hereinafter also referred to as a hooking operator or a shadowing operator. By the use of the shadowing operator, deep neural network 100 may be implemented using a conventional deep learning model framework, and custom actual computations of a certain sub-model thereof can be executed in the TEE.

As shown in FIG. 1, for example, during the training iteration of deep neural network 100, when a deep learning framework invokes operator 125-1 in hooking portion 120, operator 125-1 invokes corresponding execution operator 145-1, and transmits, through the invocation, a received input and other possible parameters to execution operator 145-1. Execution operator 145-1 then performs the actual computation on the basis of the input, and returns an execution result back to operator 125-1. As a non-limiting example, during the forward propagation of neuron activation, when shadowing operator Mul_Add (multiply-add) is executed, the shadowing operator may invoke the corresponding execution operator to execute corresponding multiply-add computation.

Operator 125-1 then transmits the execution result as its own execution result to next operator 125-2 indicated by a computation chain of deep neural network 100 as an input, and so on, until last operator 125-N of the hooking portion in the forward propagation transmits a computation result to operator 135-1 of the untrusted portion. Operator 135-1 of untrusted portion 130 may then continue to execute the computation outside the TEE until the forward propagation is completed. Similarly, the backward propagation of each layer in untrusted portion 130 is executed outside TEE 140 during an error backward propagation. When the backward propagation proceeds in hooking portion 120 (backward propagation is started from the last layer in hooking portion 120), the shadowing operator invokes the execution operator corresponding to the operator in the manner described above to calculate gradients, update neural network parameters, and the like, and continues to back-propagate the execution result to the previous layer until the result reaches last operator 125-1 in the backward propagation.

During one training iteration of deep neural network 100, a portion actually executed in TEE 140 usually accounts for a large part of the computation time. Since later executed layers need to acquire computation results from previously executed layers and the training is performed iteratively, the performance bottleneck in TEE 140 significantly slows down the training. Therefore, when the TEE 140 is used to ensure the security of all aspects of the execution of deep neural network 100, a policy needs to be further made to improve the overall efficiency.

Figure 2:
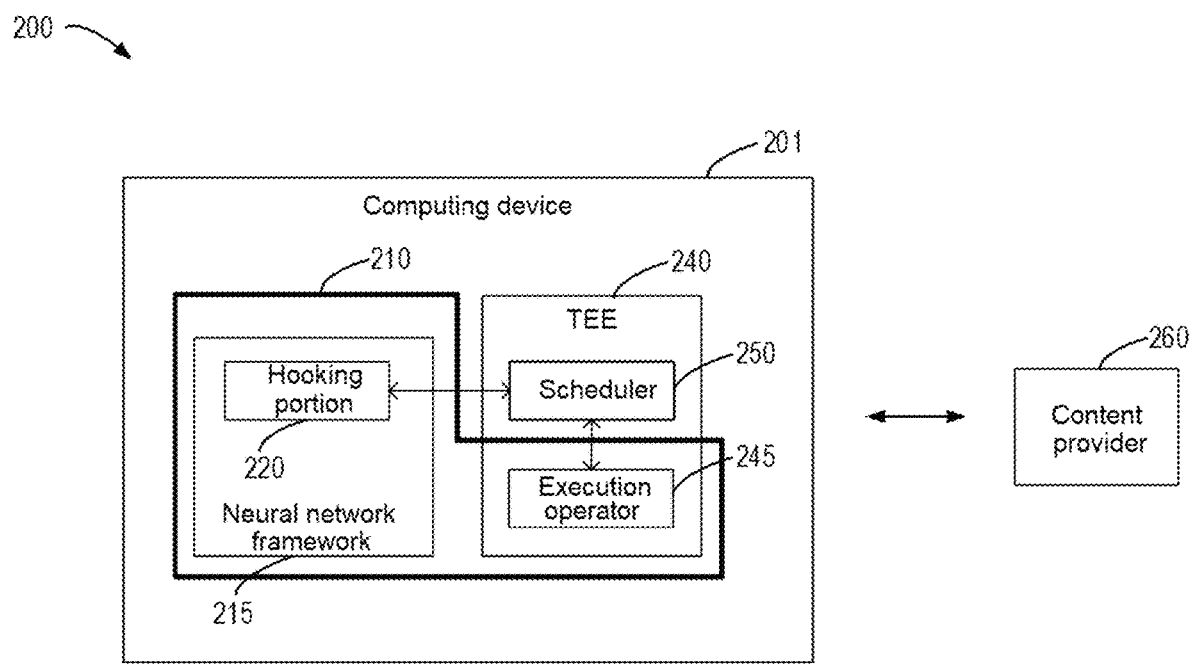
FIG. 2 shows a schematic diagram of an example environment in which a plurality of embodiments of the present disclosure can be implemented.

FIG. 2 illustrates a schematic diagram of example environment 200 in which a plurality of embodiments of the present disclosure can be implemented. Example environment 200 includes computing device 201. Computing device 201 may be any fixed, mobile, independent, or distributed computing device with sufficient computing capacity to execute the method of the present disclosure. Computing device 201 may allocate an area in its memory as TEE 240. Except for authorized interfaces, other portions in hardware cannot access information in TEE 240.

Computing device 201 may deploy overall neural network framework 215 of deep neural network 210 outside of TEE 240. Neural network framework 215 may be implemented, for example, on the basis of a conventional deep learning framework. A portion (for example, one or more foremost layers including an input layer) of deep neural network 210 may be implemented as hooking portion 220 outside TEE 240. Each operator in hooking portion 220 may be implemented as a shadowing operator that conforms to the conventional deep learning framework, and a plurality of custom execution operators 245 that implement actual functions of various shadowing operators may be deployed in TEE 240. The remaining portion of deep neural network 210 may be implemented as an untrusted portion (not shown), operators of which may be implemented in a conventional manner and executed entirely outside TEE 240. Thus, deep neural network 210 may be divided into protected sub-models that are actually implemented in TEE 240 and sub-models that are located entirely in an untrusted external world.

Computing device 201 may also deploy scheduler 250 in TEE 240. Computing device 201 may use scheduler 250 to schedule execution and interaction of code in TEE 240, transmission and storage of data, communication across a boundary of TEE 240, and the like. For example, when deep neural network 210 is executed, the invocation of an execution operator in execution operator 245 by hooking portion 220 and the returning of an invocation result may be directed by scheduler 250.

Content provider 260 may provide encrypted data for deep neural network 210. For example, these encrypted data may be transmitted into TEE 240 via the invocation of the execution operator by the operator in the input layer of the hooking portion 220. Computing device 201 may also request content provider 260 to authenticate TEE 240. After the authentication succeeds, content provider 260 may transmit, for example, via a relay (not shown) outside TEE 240 in computing device 201, a secret (for example, a decryption key) to TEE 240, so as to decrypt the foregoing encrypted data. By using the decryption key, the encrypted data may be decrypted into plaintext data in TEE 240 for execution of the execution operator in TEE 240.

The architecture and functions of example environment 200 are described for illustrative purposes only, and do not imply any limitation to the scope of the present disclosure. There may also be other devices, systems, or components that are not shown in example environment 200. For example, a developer of the custom execution operators corresponding to hooking portion 220 may authenticate TEE 240, so as to confirm that implementation of these execution operators in TEE 240 is secure.

Figure 3:
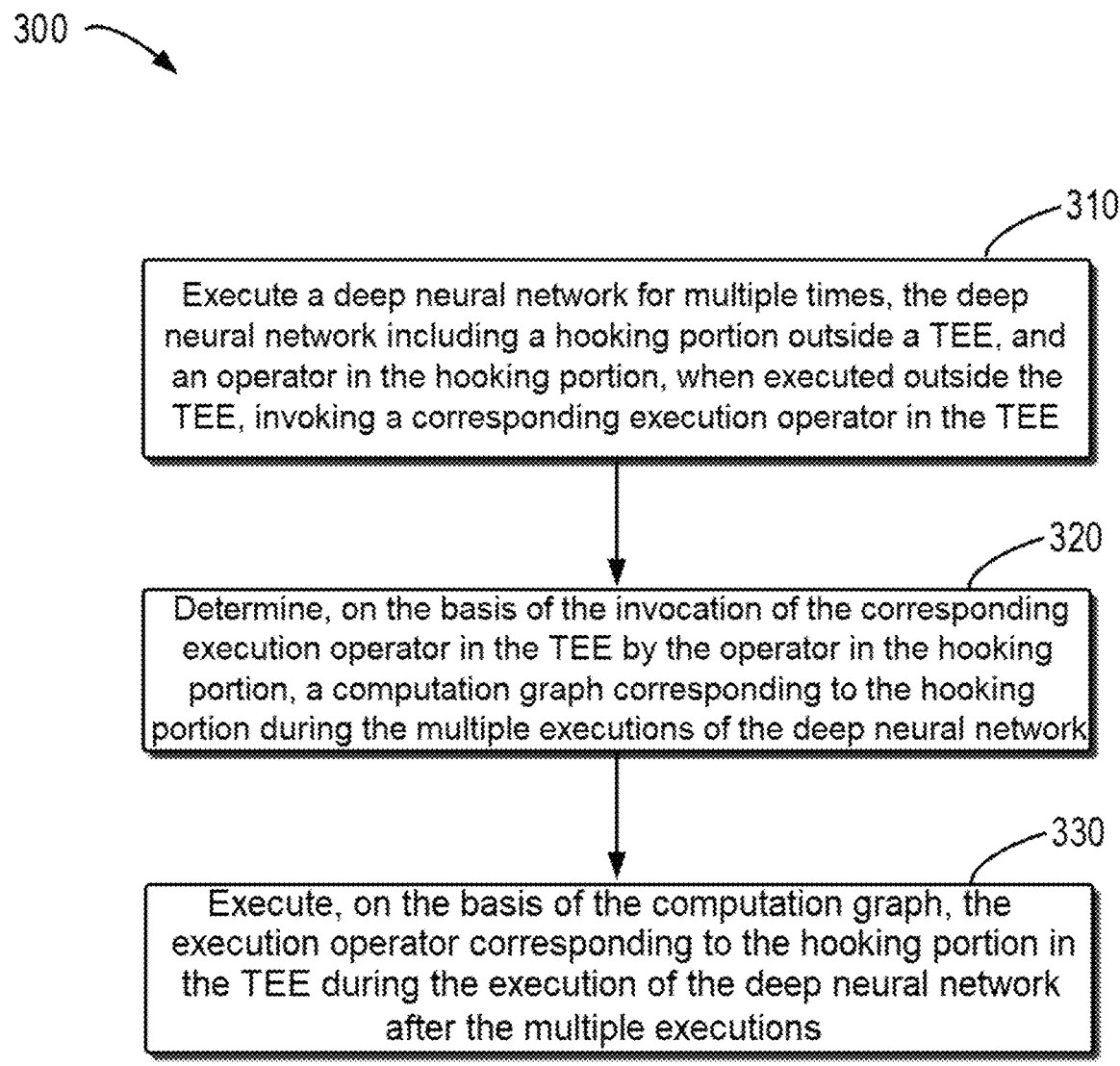
FIG. 3 shows a flow chart of an example method for executing computer programs according to some embodiments of the present disclosure.

FIG. 3 shows a flow chart of example method 300 for executing computer programs according to some embodiments of the present disclosure. Example method 300 may be implemented, for example, by computing device 201 as shown in FIG. 2. It should be understood that method 300 may also include additional actions not shown, and the scope of the present disclosure is not limited in this regard. Method 300 is described in detail below in conjunction with example environment 200 of FIG. 2.

At block 310, a deep neural network is executed for multiple times, the deep neural network including a hooking portion outside a TEE, and an operator in the hooking portion, when executed outside the TEE, invoking a corresponding execution operator in the TEE. For example, computing device 201 may execute deep neural network 210 for multiple times. When the execution of deep neural network 210 proceeds to hooking portion 220, whenever the shadowing operator in it is executed, the shadowing operator will invoke its corresponding execution operator in TEE 240. The corresponding execution operator then executes corresponding computation (for example, output computation in the forward propagation, gradient computation in the backward propagation, etc.) in TEE 240 and returns a computation result to the shadowing operator. The shadowing operator then transmits the computation result as its own computation result to a next shadowing operator in the network to continue the execution of deep neural network 210. For example, computing device 201 may use scheduler 250 to receive the invocation by the shadowing operator and direct the invocation to the corresponding execution operator in TEE 240.

The input to the deep neural network may involve sensitive data. In order to protect the privacy of these sensitive data, the sub-models that implement one or more foremost layers of the deep neural network may be loaded into the TEE. In some such embodiments, hooking portion 220 may include one or more foremost layers including the input layer of deep neural network 210. In these embodiments, computing device 201 may transmit an encrypted input (which is, for example, provided by content provider 260) into TEE 240, and the encrypted input is decrypted in the TEE (for example, using a decryption key provided by content provider 260) for the execution of the execution operator of deep neural network 210 in TEE 240.

For example, computing device 201 may execute multiple training iterations of deep neural network 210. At the beginning of each iteration, the computing device 201 feeds an encrypted training sample to the shadowing operator of the input layer of hooking portion 220. Then, when the shadowing operator of the input layer invokes the corresponding execution operator, the sample may be transmitted into TEE 240 as a portion of an invocation parameter and decrypted therein to acquire a plaintext sample. This plaintext sample may then be used as an input to the corresponding execution operator of the input layer to start the actual computation. The plaintext data sample is invisible to the world outside the TEE, so the privacy of the data is well protected.

Specific examples of deep neural network 210 may have various types of inputs. In some embodiments, the input to deep neural network 210 may include at least one of image, video, audio, text, or multimedia data.

At block 320, a computation graph corresponding to the hooking portion is determined on the basis of the invocation of the corresponding execution operator in the TEE by the operator in the hooking portion during the multiple executions (at block 310) of the deep neural network. For example, computing device 201 may configure scheduler 250 to determine, during the multiple executions of deep neural network 210 (as described with respect to block 310) on the basis of the invocation of the corresponding execution operation in TEE 240 by the shadowing operator in hooking portion 220, a computation graph corresponding to the hooking portion.

Since the overall framework of deep neural network 210 is deployed outside TEE 240, TEE 240 does not initially have the knowledge about the computation graph of deep neural network 210. The computation graph of deep neural network 210 includes structural information of deep neural network 210, which can represent the logic and state in a computation process of deep neural network 210. In this case, the execution operator in execution operator 245 needs to be executed in response to invocation information (for example, an enclave identifier for communication with the execution operator) transmitted by the shadowing operator, and returns an execution result to the outside of TEE 240.

By executing deep neural network 210 for several times and learning the invocation of actual functions in TEE 240 during this period, the computation graph corresponding to hooking portion 220 may be learned into TEE 240. This makes it possible for entities (for example, scheduler 250) in TEE 240 to know the detailed execution sequence and dependencies that reflect the various operators of this portion, thus making it possible to have an effective performance optimization strategy. Therefore, the beginning several executions are also hereinafter referred to as a warm-up stage.

In some embodiments, computing device 201 may cause the shadowing operator to transmit its function address (which may be, for example, a function name in a C/C++ based implementation) as a portion of an invocation parameter into TEE 240, for example, to scheduler 250 serving as a hub. Furthermore, at the warm-up stage, scheduler 250 may learn the computation graph of the execution operator (hereinafter also referred to as secure portion) corresponding to hooking portion 220 by means of checking the function address in the invocation parameter. Thus, an invocation chain (i.e., a chain of output invocation in the forward propagation and input invocation in the backward propagation of this portion of network) of the execution operator of the secure portion may be learned in TEE 240. In some embodiments, scheduler 250 may use the function address to detect a cycle of the invocation chain during the execution of the multiple training iterations. For example, if the transmitted invocation parameter includes the same function address corresponding to the first shadowing operator again, this means that a new round of iteration has started. In one example, the warm-up stage may include three training iterations of deep neural network 210.

At block 330, the execution operator corresponding to the hooking portion is executed in the TEE on the basis of the determined computation graph during the execution of the deep neural network after the multiple executions. For example, computing device 201 may configure scheduler 250 to execute execution operator 245 corresponding to hooking portion 220 in TEE 240 on the basis of the computation graph determined at the warm-up stage during the execution of the deep neural network after the warm-up stage.

In other words, different from redirecting the function invocation from a shadowing operator to the function invocation of a custom operator, scheduler 250 may control flowing of data between the execution operators on the basis of the learned computation graph, thus completely executing the computation of the network portion corresponding to hooking portion 220 in TEE 240, without interacting an intermediate result of the computation of this portion with the shadowing operator. A manner for executing the secure portion of the deep neural network in the TEE on the basis of the computation graph will be described below in more detail according to FIG. 4.

Figure 4:
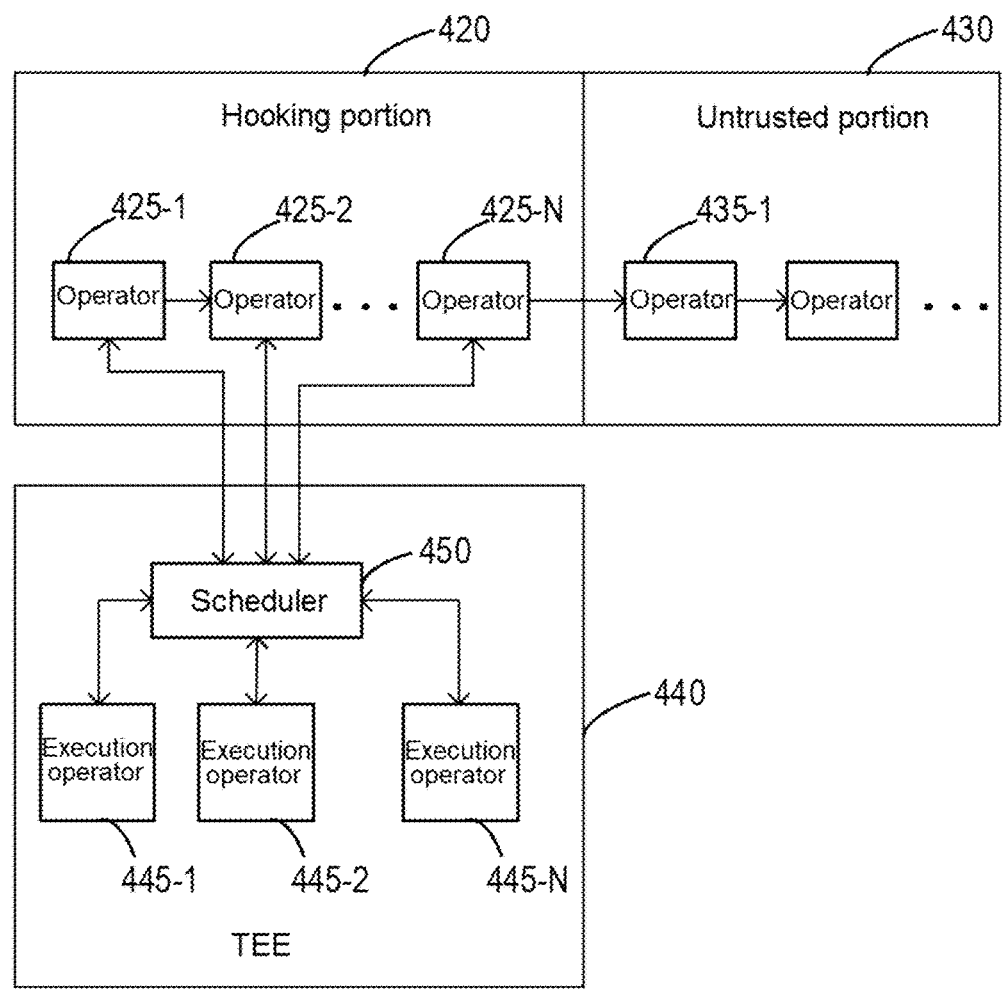
FIG. 4 shows a schematic diagram of an example deployment of executing a deep neural network according to some embodiments of the present disclosure.

FIG. 4 shows a schematic diagram of a deployment of executing deep neural network 400 according to some embodiments of the present disclosure. Deep neural network 400 may be regarded as an example implementation of deep neural network 210 in FIG. 2 and may be executed by computing device 201 in accordance with the method described in the present disclosure. FIG. 4 will be described below in the context about the deployment of computing device 201 and the execution of deep neural network 400.

As shown in FIG. 4, computing device 201 may deploy an overall framework of deep neural network 400 outside TEE 440 according to a deep learning framework. One or more foremost layers including an input layer in deep neural network 400 are implemented as hooking portion 420. Execution operators 445-1 to 445-N (collectively referred to as execution operation 445) corresponding to operators 425-1 to 425-N (collectively referred to as operator 425) therein are loaded in TEE 440.

Computing device 201 also deploys scheduler 450 in TEE 440 as a hub for scheduling invocations across the boundary of TEE 440. The invocation of the execution operator by each operator 425 in hooking portion 420 is transmitted to scheduler 450. Parameters of this invocation may include a conventional parameter for executing functions of operator 425, an enclave identifier for identifying the location of the corresponding execution operator, and a function address that helps scheduler 450 (as mentioned above with respect to block 320) learn a computation graph. These invocations are then scheduled collectively by scheduler 450. Similarly, the execution operator returns its execution result to scheduler 450 for unified scheduling. This is different from the fact that the operators in the hooking portion respectively invoke the execution operators and receive returned computation results. When each operator respectively interacts with the execution operator, only the conventional execution parameter and the identifier for positioning the execution operator are usually transmitted during the invocation to acquire the computation results, without considering the learning of the computation graph.

The operators in untrusted portion 430 receive the conventional execution parameters and are executed outside TEE 440, without interaction with an entity in TEE 440.

As described above with respect to block 320, during the warm-up stage (for example, the beginning several iterations of training), scheduler 450 may memorize the computation graph of the secure portion corresponding to hooking portion 420 in TEE 440. When execution of deep neural network 400 is continued after the warm-up stage, scheduler 450 may use the determined computation graph to schedule the execution operator of the secure portion for execution in TEE 440.

In some embodiments, when the execution of deep neural network 400 proceeds to the first executed operator of hooking portion 420, scheduler 450 may receive the invocation of the corresponding execution operator by the operator, and thus start the execution of the secure portion in TEE 440. In order to execute the secure portion in TEE 440, scheduler 450 directs the first invocation to the corresponding execution operator to execute the execution operator.

Scheduler 450 may then transmit an execution result of the execution operator in TEE 440 to a next operator indicated by the computation graph to invoke the next operator, and so on, until the execution operation corresponding to the last operator of hooking portion 420 is invoked. The output from each execution operator will not be transmitted out of TEE 440 before the computation reaches the last execution operator corresponding to the last operator of hooking portion 420. Finally, the scheduler transmits the output from the last executed operator to the last operator corresponding to the hooking portion.

For example, in forward propagation, when scheduler 450 receives an invocation of execution operator 445-1 by operator 425-1, the scheduler may direct the invocation to operator 445-1. Scheduler 450 then uses transmitted input data to execute execution operator 445-1 and transmits, according to the computation graph, its execution result to execution operator 445-2 to continue the execution. The remaining execution operators in the secure portion are executed in a similar manner according to the computation graph until last execution operator 445-N completes the computation. Finally, scheduler 450 transmits the execution result of the last execution operator to last operator 425-N of the hooking portion. Operator 425-N then transmits the result to operator 435-1, which relies on its input, in untrusted portion 430. The execution of the remaining portion of deep neural network 400 may be then continued outside TEE 440. Similarly, the invocation of the backward propagation is transmitted into the TEE starting from the invocation of first operator 425-N in this direction, and is carried out in TEE 440 until execution operator 445-1 corresponding to last operator 425-1 in this direction is executed.

In some embodiments, scheduler 450 may add an indicator to execution operator 445 according to the learned computation graph. The indicator indicates whether the operator is the last operator of a forward/backward computation path. Only the execution result of the last operator needs to be transmitted out of TEE 440 and input into the framework of deep neural network 400 to continue the execution of the remaining portion.

In order to ensure that the overall framework of deep neural network 400 can function normally, during the execution of deep neural network 400, it is expected that each hooking operator acquires an output returned by the corresponding execution operator and transmits the same to a next hooking operator. Therefore, in some embodiments, in the optimization execution stage, if a corresponding operator in hooking portion 420 invokes an execution operator in TEE 440, scheduler 450 may determine, on the basis of the computation graph, whether the corresponding operator is the last operator. If it is determined that the corresponding operator is not the last operator, scheduler 450 may transmit a dummy to the corresponding operator as the output from the corresponding operator. For example, since operator 425-2 is not the last operator of the hooking portion in any execution direction, scheduler 450 will return a dummy to operator 425-2 when the operator invokes the execution operator. In another aspect, when last operator 425-N of hooking portion 420 in forward propagation transmits an invocation into TEE 440, scheduler 450 will wait until the secure portion in TEE 440 is completely executed, and return an actual execution result of last execution operator 445-N to operator 425-N.

At the optimization execution stage, the computation path corresponding to the hooking portion 420 is completely executed in the TEE 440, and only a final result is returned to the hooking portion, which can reduce the unnecessary communication cost across the boundary of the TEE, thereby improving the execution efficiency of the deep neural network portion protected by the TEE. It should be understood that although scheduler 450 is shown as a component of deep neural network 400 for ease of illustration, scheduler 450 may be independent of the computation framework of the deep neural network. In addition, although computing device 201 uses separate scheduler 450 to schedule the learning and execution of the computation graph in the examples below, other implementations may also be used to accomplish these actions in specific implementations.

Figure 5:
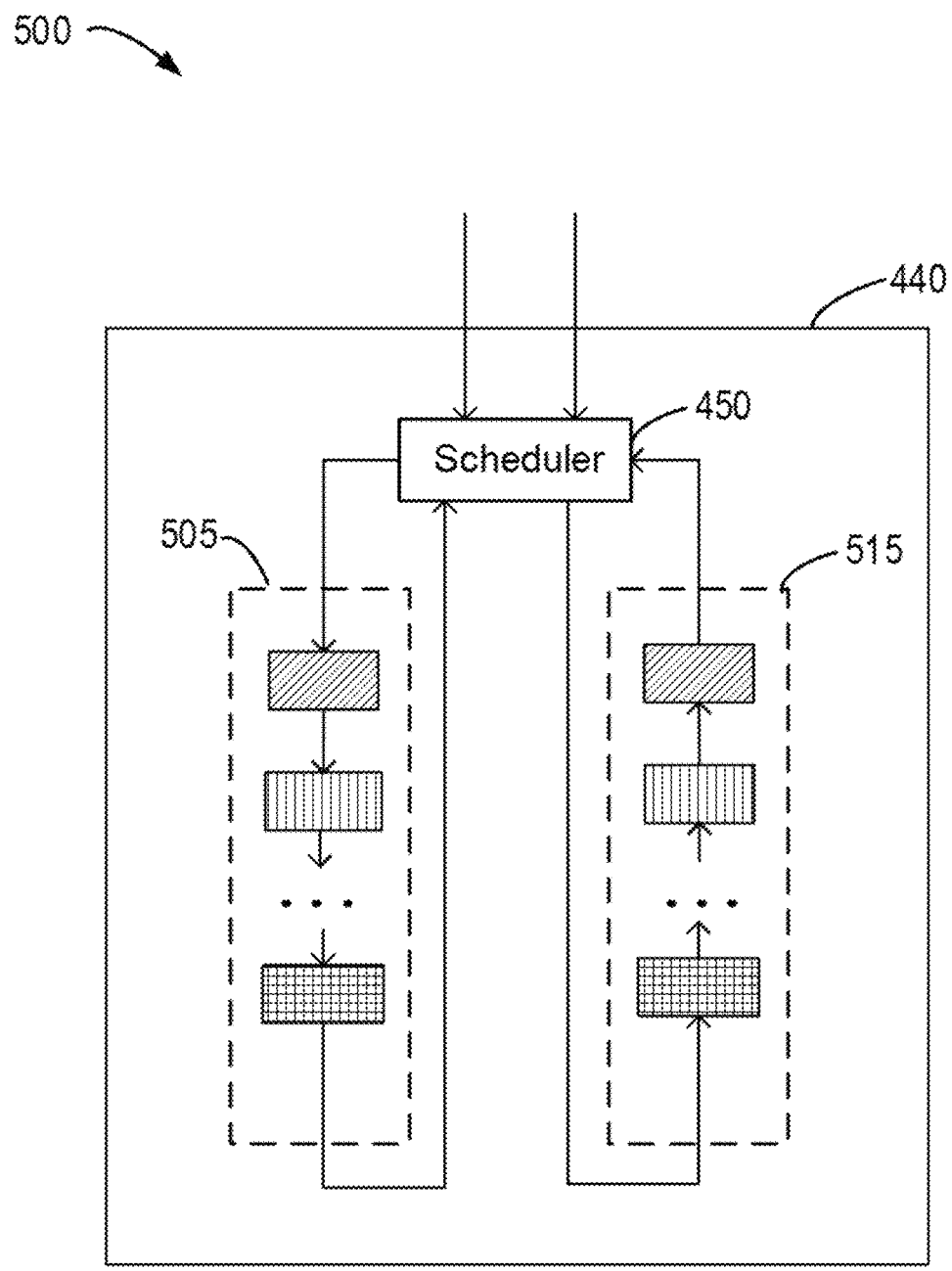
FIG. 5 shows a schematic diagram of executing a deep neural network according to some embodiments of the present disclosure, wherein forward propagation and backward propagation of training iterations of the deep neural network in a TEE are shown.

Some embodiments of the present disclosure may be used in the training stage of the deep neural network. In such an embodiment, one execution of the deep neural network referred to in the present disclosure corresponds to a round of training iteration including forward propagation and backward propagation. FIG. 5 shows schematic diagram 500 of executing a deep neural network according to some embodiments of the present disclosure, wherein forward propagation and backward propagation of training iterations of deep neural network 400 in TEE 440 in FIG. 4 are shown.

When training data is transmitted to scheduler 450 by the first shadowing operator, scheduler 450 will start the forward propagation of the execution operator indicated by dashed box 505 in TEE 440 until it reaches the last layer of the secure portion. The computation result of the secure portion is then transmitted out of TEE 440 via scheduler 450 to continue the forward propagation.

When a gradient of backward propagation is transmitted to scheduler 450 by the shadowing operator corresponding to the last layer of the secure portion (i.e., the first invoked operator of this portion in the backward propagation), scheduler 450 will start to execute the backward propagation of the operator indicated by dashed box 515 in TEE 440 until it reaches the first layer of the secure portion. A backward propagation result of this portion is then transmitted out of TEE 440 via the scheduler for continued execution. In this example, the first layer is the input layer of deep neural network 400, and an end mark informing the end of this round of iteration can be returned.

The training stage of the deep neural model needs to be executed iteratively, and a next iteration will not start until the current iteration is completed. In each iteration, computations outside the TEE will not start until the computations in the TEE are completed. In a one-way task in multiple executions, at the optimization execution stage after the warm-up stage, the time of each execution may partially overlap to perform concurrent computation, thereby saving the overall execution time.

However, as shown in FIG. 4, bidirectional execution is required in each training iteration of deep neural network 400. The backward propagation needs to be executed after the forward propagation, so as to update network weight parameters via gradient descent and the like. Meanwhile, the computation of the next iteration requires a weighted network with the parameters updated. Therefore, if the next iteration starts before the backward propagation of this iteration, there will be a problem that not all the parameters of the neural network are updated.

In order to solve the parameter update problem described above, in some embodiments, during the error backward propagation of multiple rounds of training iterations at the warm-up stage, computing device 201 may also store the calculated gradient of each component in each round of iteration (for example, in a page heap initialized during configuration of an execution environment). Based on this, in the training iteration after the warm-up stage, before the current training iteration of deep neural network 400 starts, computing device 201 may update the parameters of deep neural network 400 on the basis of the stored multiple rounds of gradients. For example, computing device 201 may implement gradient descent in the TEE to update the parameters of deep neural network 400 using the average value of records of various rounds of gradients in a gradient heap as a momentum.

Further, during the backward propagation of the current training iteration, computing device 201 may store the gradient of the current training iteration, and replace the gradient of the oldest round of training iteration among the stored multiple rounds of gradients with the gradient of the current training iteration. For example, the bottom row of the gradient heap may be removed, and the gradient calculated from this iteration will be pushed to the top of the heap. In this way, the gradients of the latest N rounds of iterations may always be stored for parameter update, so that the forward propagation may function normally during the concurrent iterations.

Since the gradients may be updated prior to each iteration, computing device 201 may then input a next mini-batch of training data at the end of each forward propagation of the hooking portion of deep neural network 400, so as to concurrently start the execution of the next round of training iteration. Meanwhile, the current iteration still continues to be executed. The optimization execution stage after the warm-up stage may thus be regarded as a concurrent execution stage.

Figure 6:
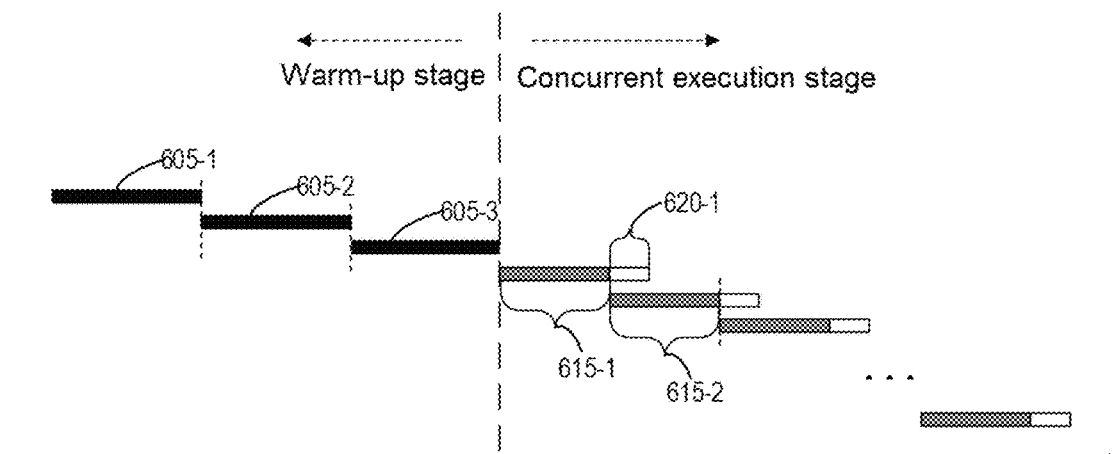
FIG. 6 shows a schematic time axis of executing training iterations of a deep neural network according to some embodiments of the present disclosure.

FIG. 6 shows schematic time axis 600 of executing training iterations of deep neural network 400 by computing device 201 (as shown in FIG. 4) according to some embodiments of the present disclosure. As mentioned above, after the warm-up stage, each training iteration portion is concurrently executed, and the parameters of deep neural network 400 are updated according to the stored previous several rounds of gradients. It should be understood that the number of iterations and durations of time periods in FIG. 6 are shown qualitatively as examples only, rather than a precise quantitative description.

As shown in FIG. 6, at the warm-up stage, computing device 201 sequentially executes training iterations 605-1 to 605-3 of deep neural network 400 and learns a computation graph during this period. At the subsequent concurrent execution stage, computing device 201 causes, according to the computation graph, the secure portion to be executed entirely in TEE 440. Once the forward propagation of the current iteration in TEE 440 is completed, computing device 201 starts the next round of iteration while the current iteration proceeds. For example, once forward propagation 615-1 of the current iteration in TEE 440 is completed, computing device 201 may immediately start forward propagation 615-2 of the next iteration. As indicated by reference numeral 620-1, the current iteration proceeds concurrently. In this way, there is always a workload running in TEE 440, so that the iteration time may partially overlap, and the overall execution time can be saved.

Figure 7:
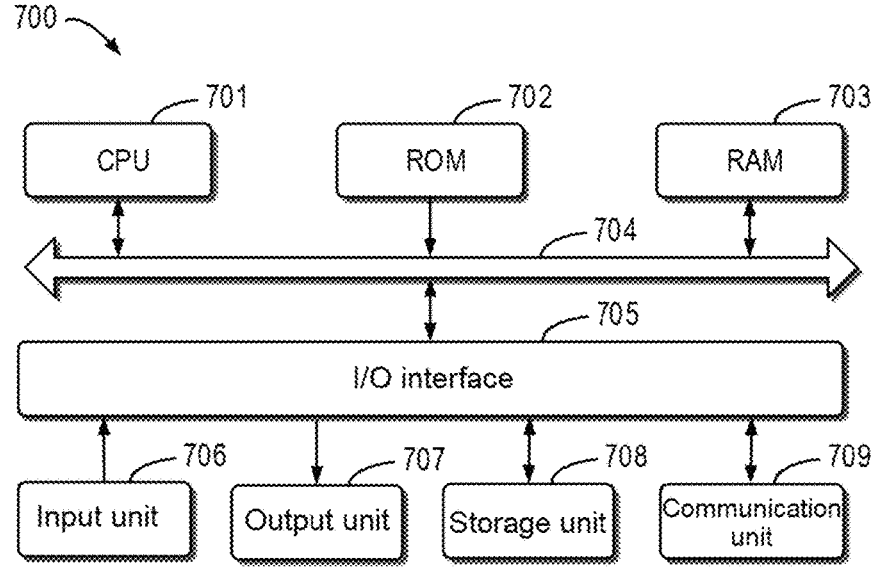
FIG. 7 illustrates a schematic block diagram of a device that can be used to implement embodiments of the present disclosure.

FIG. 7 illustrates a schematic block diagram of device 700 that may be used to implement embodiments of the present disclosure. Device 700 may be a device or apparatus as described in embodiments of the present disclosure, such as computing device 201. As shown FIG. 7, device 700 includes central processing unit (CPU) 701, which may execute various appropriate actions and processing in accordance with computer program instructions stored in read-only memory (ROM) 702 or computer program instructions loaded from storage unit 708 onto random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704. Although not shown in FIG. 7, device 700 may also include a co-processor.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various methods or processes described above may be performed by CPU 701. For example, in some embodiments, the method may be implemented as a computer software program that is tangibly included in a machine-readable medium, such as storage unit 708. In some embodiments, part or all of the computer program may be loaded and/or installed onto device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method, comprising:
   implementing multiple executions of a deep neural network, the deep neural network comprising a hooking portion outside a trusted execution environment (TEE), wherein an operator in the hooking portion, when executed outside the TEE, invokes a corresponding execution operator in the TEE;
   determining, on the basis of the invocation of the corresponding execution operator in the TEE by the operator in the hooking portion, a computation graph corresponding to the hooking portion during the multiple executions of the deep neural network; and executing, on the basis of the computation graph, the execution operator corresponding to the hooking portion in the TEE during the execution of the deep neural network after the multiple executions;

wherein the executing, on the basis of the computation graph, the execution operator corresponding to the hooking portion in the TEE comprises:

transmitting, after a first operator of the hooking portion invokes an execution operator corresponding to the first operator, an output from each invoked execution operator to a next operator indicated by the computation graph in the TEE to invoke the next operator until an execution operator corresponding to the last operator of the hooking portion is invoked; and transmitting an output from the invocation of the execution operator corresponding to the last operator to the last operator of the hooking portion as an output from the last operator.

2. The method according to claim 1, wherein the hooking portion comprises an input layer of the deep neural network, and the method further comprises:

transmitting an encrypted input to the neural network into the TEE; and decrypting the encrypted input in the TEE.

3. The method according to claim 2, wherein one execution of the deep neural network corresponds to one round of training iteration that comprises forward propagation and backward propagation of the deep neural network, and the method further comprises:

during the backward propagation of multiple rounds of training iterations corresponding to the multiple executions, storing calculated multiple rounds of gradients of the multiple rounds of training iterations.

4. The method according to claim 3, wherein the executing the deep neural network after the multiple executions further comprises:

updating parameters of the deep neural network on the basis of the stored multiple rounds of gradients before a current training iteration corresponding to the execution of the deep neural network starts;

storing a gradient of the current training iteration during the backward propagation of the current training iteration; and replacing a gradient of the oldest training iteration in the multiple rounds of gradients with the gradient of the current training iteration.

5. The method according to claim 4, wherein the executing the deep neural network after the multiple executions further comprises:

in response to the end of the forward propagation of the hooking portion, concurrently starting to execute the next round of training iteration while continuing the execution of the current training iteration.

6. The method according to claim 1, wherein the executing, on the basis of the computation graph, the execution operator corresponding to the hooking portion in the TEE further comprises:

in response to the corresponding operator in the hooking portion invoking the execution operator, determining, in the TEE on the basis of the computation graph, whether the corresponding operator is the last operator; and transmitting a dummy to the corresponding operator as an output from the corresponding operator in response to determining that the corresponding operator is not the last operator.

7. The method according to claim 1, wherein the type of an input to the deep neural network comprises at least one of the following: image; video; audio; text; or multimedia data.

8. An electronic device, comprising:

at least one processor; and memory coupled to the at least one processor, wherein the memory has instructions stored therein which, when executed by the at least one processor, cause the electronic device to execute actions comprising:

implementing multiple executions of a deep neural network, the deep neural network comprising a hooking portion outside a trusted execution environment (TEE), wherein an operator in the hooking portion, when executed outside the TEE, invokes a corresponding execution operator in the TEE;

determining, on the basis of the invocation of the corresponding execution operator in the TEE by the operator in the hooking portion, a computation graph corresponding to the hooking portion during the multiple executions of the deep neural network; and executing, on the basis of the computation graph, the execution operator corresponding to the hooking portion in the TEE during the execution of the deep neural network after the multiple executions;

wherein the executing, on the basis of the computation graph, the execution operator corresponding to the hooking portion in the TEE comprises:

transmitting, after a first operator of the hooking portion invokes an execution operator corresponding to the first operator, an output from each invoked execution operator to a next operator indicated by the computation graph in the TEE to invoke the next operator until an execution operator corresponding to the last operator of the hooking portion is invoked; and transmitting an output from the invocation of the execution operator corresponding to the last operator to the last operator of the hooking portion as an output from the last operator.

9. The electronic device according to claim 8, wherein the hooking portion comprises an input layer of the deep neural network, and the actions further comprise:

transmitting an encrypted input to the neural network into the TEE; and decrypting the encrypted input in the TEE.

10. The electronic device according to claim 9, wherein one execution of the deep neural network corresponds to one round of training iteration that comprises forward propagation and backward propagation of the deep neural network, and the actions further comprise:

during the backward propagation of multiple rounds of training iterations corresponding to the multiple executions, storing calculated multiple rounds of gradients of the multiple rounds of training iterations.

11. The electronic device according to claim 10, wherein the executing the deep neural network after the multiple executions further comprises:

updating parameters of the deep neural network on the basis of the stored multiple rounds of gradients before a current training iteration corresponding to the execution of the deep neural network starts;

storing a gradient of the current training iteration during the backward propagation of the current training iteration; and replacing a gradient of the oldest training iteration in the multiple rounds of gradients with the gradient of the current training iteration.

12. The electronic device according to claim 11, wherein the executing the deep neural network after the multiple executions further comprises:
    in response to the end of the forward propagation of the hooking portion, concurrently starting to execute the next round of training iteration while continuing the execution of the current training iteration.

13. The electronic device according to claim 8, wherein the executing, on the basis of the computation graph, the execution operator corresponding to the hooking portion in the TEE further comprises:
    in response to the corresponding operator in the hooking portion invoking the execution operator, determining, in the TEE on the basis of the computation graph, whether the corresponding operator is the last operator; and
    transmitting a dummy to the corresponding operator as an output from the corresponding operator in response to determining that the corresponding operator is not the last operator.

14. The electronic device according to claim 8, wherein the type of an input to the deep neural network comprises at least one of the following: image; video; audio; text; or multimedia data.

15. A computer program product tangibly stored on a non-transitory computer-readable medium and comprising machine-executable instructions, wherein the machine-executable instructions, when executed by a machine, cause the machine to perform a actions comprising:
    implementing multiple executions of a deep neural network, the deep neural network comprising a hooking portion outside a trusted execution environment (TEE), wherein an operator in the hooking portion, when executed outside the TEE, invokes a corresponding execution operator in the TEE;
    determining, on the basis of the invocation of the corresponding execution operator in the TEE by the operator in the hooking portion, a computation graph corresponding to the hooking portion during the multiple executions of the deep neural network; and
    executing, on the basis of the computation graph, the execution operator corresponding to the hooking portion in the TEE during the execution of the deep neural network after the multiple executions;
    wherein the executing, on the basis of the computation graph, the execution operator corresponding to the hooking portion in the TEE comprises:
    transmitting, after a first operator of the hooking portion invokes an execution operator corresponding to the first operator, an output from each invoked execution operator to a next operator indicated by the computation graph in the TEE to invoke the next operator until an execution operator corresponding to the last operator of the hooking portion is invoked; and
    transmitting an output from the invocation of the execution operator corresponding to the last operator to the last operator of the hooking portion as an output from the last operator.

16. The computer program product according to claim 15, wherein the hooking portion comprises an input layer of the deep neural network, and the actions further comprise:
    transmitting an encrypted input to the neural network into the TEE; and
    decrypting the encrypted input in the TEE.

17. The computer program product according to claim 16, wherein one execution of the deep neural network corresponds to one round of training iteration that comprises forward propagation and backward propagation of the deep neural network, and the actions further comprise:
    during the backward propagation of multiple rounds of training iterations corresponding to the multiple executions, storing calculated multiple rounds of gradients of the multiple rounds of training iterations.

18. The computer program product according to claim 17, wherein the executing the deep neural network after the multiple executions further comprises:
    updating parameters of the deep neural network on the basis of the stored multiple rounds of gradients before a current training iteration corresponding to the execution of the deep neural network starts;
    storing a gradient of the current training iteration during the backward propagation of the current training iteration; and
    replacing a gradient of the oldest training iteration in the multiple rounds of gradients with the gradient of the current training iteration.

19. The computer program product according to claim 15, wherein the executing, on the basis of the computation graph, the execution operator corresponding to the hooking portion in the TEE further comprises:
    in response to the corresponding operator in the hooking portion invoking the execution operator, determining, in the TEE on the basis of the computation graph, whether the corresponding operator is the last operator; and
    transmitting a dummy to the corresponding operator as an output from the corresponding operator in response to determining that the corresponding operator is not the last operator.

20. The computer program product according to claim 15, wherein the type of an input to the deep neural network comprises at least one of the following: image; video; audio; text; or multimedia data.

* * * * *